(12) United States Patent
Li

(10) Patent No.: US 12,119,023 B2
(45) Date of Patent: Oct. 15, 2024

(54) AUDIO ONSET DETECTION METHOD AND APPARATUS

(71) Applicant: BEIJING BYTEDANCE NETWORK TECHNOLOGY CO., LTD., Beijing (CN)

(72) Inventor: Wei Li, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 496 days.

(21) Appl. No.: 17/434,628

(22) PCT Filed: Feb. 27, 2020

(86) PCT No.: PCT/CN2020/077024
§ 371 (c)(1),
(2) Date: Apr. 26, 2022

(87) PCT Pub. No.: WO2020/173488
PCT Pub. Date: Sep. 3, 2020

(65) Prior Publication Data
US 2022/0358956 A1   Nov. 10, 2022

(30) Foreign Application Priority Data

Feb. 28, 2019   (CN) .......................... 201910151015.0

(51) Int. Cl.
*G10L 25/81* (2013.01)
*G10L 25/18* (2013.01)
*G10L 25/87* (2013.01)

(52) U.S. Cl.
CPC .............. *G10L 25/81* (2013.01); *G10L 25/18* (2013.01); *G10L 25/87* (2013.01)

(58) Field of Classification Search
None
See application file for complete search history.

(56) References Cited

U.S. PATENT DOCUMENTS

| 4,833,713 A | 5/1989 | Muroi et al. |
| 2008/0201150 A1 | 8/2008 | Tamura et al. |

(Continued)

FOREIGN PATENT DOCUMENTS

| CN | 1773605 A | 5/2006 |
| CN | 101031958 A | 9/2007 |

(Continued)

OTHER PUBLICATIONS

International Patent Application No. PCT/CN2020/077024; Int'l Search Report; dated May 29, 2020; 3 pages.

*Primary Examiner* — Hemant S Patel
(74) *Attorney, Agent, or Firm* — BakerHostetler

(57) ABSTRACT

An audio onset detection method and apparatus, an electronic device, and a computer readable storage medium. The audio onset detection method comprises: determining a first voice frequency spectrum parameter corresponding to each frequency band according to a frequency domain signal corresponding to an audio signal of an audio; for each frequency band, determining a second voice frequency spectrum parameter of a current frequency band according to the first voice frequency spectrum parameter of the current frequency band and the first voice frequency spectrum parameters of frequency bands positioned before the current frequency band according to a time sequence; and determining one or more onset positions of notes and syllables in the audio according to the second voice frequency spectrum parameters corresponding to the frequency bands.

18 Claims, 6 Drawing Sheets

(56) References Cited

U.S. PATENT DOCUMENTS

| | | | | |
|---|---|---|---|---|
| 2012/0095755 A1* | 4/2012 | Otani | ................... | H04R 3/00 |
| | | | | 704/E21.002 |
| 2019/0066714 A1* | 2/2019 | Nakayama | .............. | G10L 25/90 |

FOREIGN PATENT DOCUMENTS

| | | | |
|---|---|---|---|
| CN | 101996628 | A | 3/2011 |
| CN | 104143324 | A | 11/2014 |
| CN | 104681038 | A | 6/2015 |
| CN | 105280196 | A | 1/2016 |
| CN | 105304073 | A | 2/2016 |
| CN | 106663449 | A | 5/2017 |
| CN | 107251137 | A | 10/2017 |
| CN | 107704447 | A | 2/2018 |
| CN | 108198547 | A | 6/2018 |
| CN | 108256307 | A | 7/2018 |
| CN | 108320730 | A | 7/2018 |
| CN | 108510987 | A | 9/2018 |
| CN | 108962226 | A | 12/2018 |
| CN | 109256146 | A | 1/2019 |
| CN | 110070884 | A | 7/2019 |
| CN | 110070885 | A | 7/2019 |
| CN | 110085214 | A | 8/2019 |
| EP | 3182413 | A1 | 6/2017 |
| EP | 3392882 | A1 | 10/2018 |
| JP | H02-230296 | A | 9/1990 |
| JP | 2011-053565 | A | 3/2011 |

* cited by examiner

AUDIO ONSET DETECTION METHOD AND APPARATUS

FIELD

The present application is the national phase application of PCT International Patent Application No. PCT/CN2020/077024, filed on Feb. 27, 2020, which claims priority to Chinese Patent Application No. 201910151015.0, titled "AUDIO ONSET DETECTION METHOD AND APPARATUS", filed on Feb. 28, 2019 with the Chinese Patent Office, both of which are incorporated herein by reference in their entireties.

BACKGROUND

The audio onset detection technology is an information extraction algorithm applied to an audio signal, and aims to accurately detect onsets of a note and a syllable. The note refers to a music signal, and the syllable refers to a human voice signal. The audio onset detection technology has significant uses and application prospects in the field of signal processing, for example, automatic segmentation, automatic labeling, information extraction, segmentation compression for a human voice and a music audio, and interactive entertainment. FIG. 1a and FIG. 1b show onset detection, where FIG. 1a shows an audio signal, and FIG. 1b shows detected onsets.

In the conventional technology, a speech spectrum parameter curve corresponding to an audio signal is generally calculated, a local highest point of the curve is determined, and a speech spectrum parameter corresponding to the point is compared with a preset threshold. If the speech spectrum parameter corresponding to the point is greater than the preset threshold, a location corresponding to the point is determined as an onset.

The above method is mainly applied to an audio signal with a clear boundary and a relatively single rhythm (such as a fast-paced music with a clear note boundary and a relatively single rhythm). For some audios (such as a mixed music formed by multiple musical instruments, a music with a slow-paced rhythm and a human voice) that are complex and have a weak rhythm, the boundary cannot be accurately detected with the above method, resulting in frequent false detection and missing detection.

SUMMARY

In a first aspect, an audio onset detection method is provided according to an embodiment of the present disclosure. The method includes:
  determining first speech spectrum parameters of frequency bands according to a frequency domain signal corresponding to an audio signal of an audio;
  determining, for each of the frequency bands, a second speech spectrum parameter of a current frequency band based on a first speech spectrum parameter of the current frequency band and a first speech spectrum parameter of a frequency band chronologically before the current frequency band; and
  determining one or more onsets of a note and a syllable in the audio based on second speech spectrum parameters of the frequency bands.

Further, the steps of determining, for each of the frequency bands, a second speech spectrum parameter of a current frequency band based on a first speech spectrum parameter of the current frequency band and a first speech spectrum parameter of a frequency band chronologically before the current frequency band includes:
  for each of the frequency bands, determining a mean value of the first speech spectrum parameter of the current frequency band based on the first speech spectrum parameter of the current frequency band and the first speech spectrum parameter of the frequency band chronologically before the current frequency band, and taking the determined mean value as the second speech spectrum parameter of the current frequency band.

Further, the steps of determining, for each of the frequency bands, a second speech spectrum parameter of a current frequency band based on a first speech spectrum parameter of the current frequency band and a first speech spectrum parameter of a frequency band chronologically before the current frequency band includes:
  for each of the frequency bands, determining a mean value of the first speech spectrum parameter of the current frequency band based on the first speech spectrum parameter of the current frequency and the first speech spectrum parameter of the frequency band chronologically before the current frequency band; and
  determining the second speech spectrum parameter of the current frequency band based on the first speech spectrum parameter of the current frequency band and the determined mean value.

Further, the determining the second speech spectrum parameter of the current frequency band based on the first speech spectrum parameter of the current frequency band and the mean value includes:
  calculating a difference between the first speech spectrum parameter of the current frequency band and the determined mean value; and
  determining the second speech spectrum parameter of the current frequency band based on the difference.

Further, the step of determining the second speech spectrum parameter of the current frequency band based on the difference includes:
  determining a mean value of the difference according to a difference corresponding to the current frequency band and a difference corresponding to the frequency band chronologically before the current frequency band, and taking the determined mean value of the difference as the second speech spectrum parameter of the current frequency band.

Further, the step of determining one or more onsets of a note and a syllable in the audio based on second speech spectrum parameters of the frequency bands includes:
  drawing a speech spectrum parameter curve based on the second speech spectrum parameters of the frequency bands; and
  determining a local highest point according to the speech spectrum parameter curve, and determining one or more onsets of the note and the syllable in the audio based on a second speech spectrum parameter corresponding to the local highest point.

Further, the step of determining first speech spectrum parameters of frequency bands according to a frequency domain signal corresponding to an audio signal of an audio includes:
  dividing the audio signal of the audio into multiple sub audio signals, and converting the sub audio signals respectively into frequency domain signals, where each of the sub audio signals corresponds to each of the frequency bands; and
  determining the first speech spectrum parameters corresponding to the frequency bands, respectively.

In a second aspect, an audio onset detection device is provided according to an embodiment of the present disclosure. The device includes a first parameter determination module, a second parameter determination module and an onset determination module. The first parameter determination module is configured to determine first speech spectrum parameters of frequency bands according to a frequency domain signal corresponding to an audio signal of an audio. The second parameter determination module is configured to determine, for each of the frequency bands, a second speech spectrum parameter of a current frequency band a based on a first speech spectrum parameter of the current frequency band and a first speech spectrum parameter of a frequency band chronologically before the current frequency band. The onset determination module is configured to determine one or more onsets of a note and a syllable in the audio based on second speech spectrum parameters of the frequency bands.

Further, the second parameter determination module is specifically configured to: for each of the frequency bands, determine a mean value of the first speech spectrum parameter of the current frequency band based on the first speech spectrum parameter of the current frequency band and the first speech spectrum parameter of the frequency band chronologically before the current frequency band, as the second speech spectrum parameter of the current frequency band.

Further, the second parameter determination module includes a mean value determination unit and a second parameter determination unit. The mean value determination unit is configured to: for each of the frequency bands, determine a mean value of the first speech spectrum parameter of the current frequency band based on the first speech spectrum parameter of the current frequency band and the first speech spectrum parameter of the frequency band chronologically before the current frequency band. The second parameter determination unit is configured to determine the second speech spectrum parameter of the current frequency band based on the first speech spectrum parameter of the current frequency band and the determined mean value.

Further, the second parameter determination unit is specifically configured to: calculate a difference between the first speech spectrum parameter of the current frequency band and the mean value; and determine the second speech spectrum parameter of the current frequency band based on the difference.

Further, the second parameter determination unit is specifically configured to determine a mean value of the difference according to a difference corresponding to the current frequency band and a difference corresponding to the frequency band chronologically before the current frequency band, and taking the determined mean value of the difference as the second speech spectrum parameter of the current frequency band.

Further, the onset determination module is specifically configured to draw a speech spectrum parameter curve based on the second speech spectrum parameters of the frequency bands; and determine a local highest point according to the speech spectrum parameter curve, and determine one or more onsets of the note and the syllable in the audio based on a second speech spectrum parameter corresponding to the local highest point.

Further, the first parameter determination module is specifically configured to divide the audio signal of the audio into multiple sub audio signals, and convert the sub audio signals respectively into frequency domain signals, where each of the sub audio signals corresponds to one of the frequency bands; and determine the first speech spectrum parameters corresponding to the frequency bands, respectively.

In a third aspect, an electronic device is provided according to an embodiment of the present disclosure. The electronic device includes at least one processor and a memory communicatively connected with the at least one processor. The memory is configured to store instructions that is executable by the at least one processor. The instructions are executed by the at least one processor, to cause the at least one processor to perform the audio onset detection method described in the first aspect.

In a fourth aspect, a non-transitory computer readable storage medium is provided according to an embodiment of the present disclosure. The non-transitory computer readable storage medium is configured to store computer instructions. The computer instructions cause a computer to perform the audio onset detection method described in the first aspect.

In the embodiments of the present disclosure, according to a frequency domain signal corresponding to an audio signal of an audio, first speech spectrum parameters of frequency bands are determined. For each of the frequency bands, a second speech spectrum parameter of a current frequency band is determined based on a first speech spectrum parameter of the current frequency band and a first speech spectrum parameter of a frequency band chronologically before the current frequency band. One or more onsets of a note and a syllable in the audio are determined based on second speech spectrum parameters of the frequency bands. Since the second speech spectrum parameter is determined with reference to the first speech spectrum parameters corresponding to multiple frequency bands, the determined second speech spectrum parameter is more accurate, so that the onsets of a note and a syllable in the audio can be accurately detected, thereby reducing false detection and missing detection. Further, the referred first speech spectrum parameter is a first speech spectrum parameter of a frequency band chronologically before the current frequency band, ensuring real-time performance of the onset detection.

The above description is only an overview of the technical solutions of the present disclosure. In order to more clearly understand technical mean values used in the present disclosure to implement the present disclosure as stated in this specification, and to more clearly understood the above and other objects, features and advantages of the present disclosure, preferred embodiments are described in detail below with reference to the drawings.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION

Figure 1A:
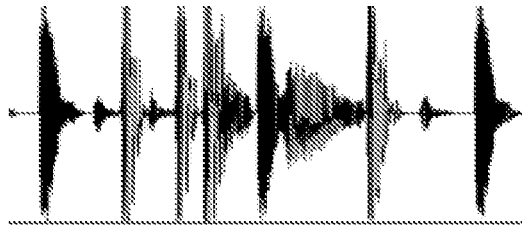
FIG. 1a is a schematic diagram of an audio signal in the conventional technology.
Figure 1B:
FIG. 1b is a schematic diagram showing an audio onset detection result in the conventional technology.

Embodiments of the present disclosure are described below by specific examples, and those skilled in the art may easily understand other advantages and effects of the present disclosure based on contents disclosed in this specification. It is apparent that the described embodiments are only a part of the embodiments of the present disclosure, rather than all embodiments. The present disclosure may be implemented or applied by various other specific embodiments, and various modifications and changes may be made to details of this specification based on different views and applications without departing from the spirit of the present disclosure. It should be noted that the following embodiments and features in the embodiments may be combined with each other without conflict. All other embodiments obtained by those skilled in the art based on the embodiments of the present disclosure without any creative work fall in the protection scope of the present disclosure.

It should be noted that various aspects of the embodiments within the scope of the appended claims are described below. It is apparent that, the aspects described herein may be embodied in a wide variety of forms, and any particular structure and/or function described herein is merely illustrative. Based on the present disclosure, those skilled in the art should appreciate that, one aspect described herein may be implemented independently of any other aspects and two or more of these aspects may be combined in various ways. For example, the device and/or method may be implemented using any number of the aspects set forth herein. In addition, the device and/or method may be implemented using other structures and/or functionalities than one or more of the aspects set forth herein.

It should further be noted that the drawings provided in the following embodiments merely illustrate the basic concept of the present disclosure in a schematic manner, and only components related to the present disclosure are shown in the drawings. The drawings are not drawn based on the number, the shape and the size of components in actual implementation. The type, the number and the proportion of the components may be changed randomly in the actual implementation, and a layout of the components may be more complicated.

In addition, in the following description, specific details are provided to facilitate a thorough understanding of the examples. However, those skilled in the art should appreciate that the aspects may be practiced without these specific details.

The First Embodiment

Figure 2A:
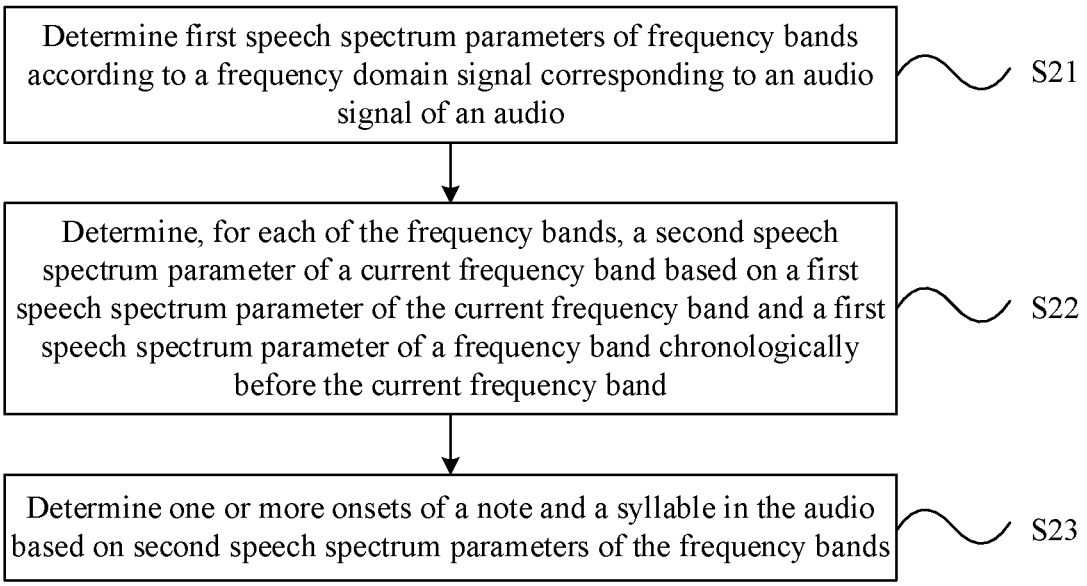
FIG. 2a is a flow chart of an audio onset detection method according to a first embodiment of the present disclosure.

FIG. 2a is a flow chart of an audio onset detection method according to a first embodiment of the present disclosure. The audio onset detection method provided in this embodiment may be performed by an audio onset detection device. The audio onset detection device may be implemented as software, or a combination of hardware and software. The audio onset detection device may be integrated in a device of an audio onset detection system, such as an audio onset detection server or an audio onset detection terminal device. This embodiment may be applied to some scenarios in which an audio (such as a mixed music formed by multiple musical instruments, a music with a slow-paced rhythm and a human voice) is complex and has a weak rhythm. As shown in FIG. 2a, the method includes the following steps S21 to S23.

In step S21, according to a frequency domain signal corresponding to an audio signal of an audio, first speech spectrum parameters of frequency bands are determined.

The audio signal may be a music or a speech. An audio signal in a time domain may be converted in a frequency domain to obtain a corresponding frequency domain signal.

Here, in order to distinguish different speech spectrum parameters, a first speech spectrum parameter and a second speech spectrum parameter are used based on an order of appearance.

The first speech spectrum parameter may be determined based on a spectrum amplitude and a spectrum phase.

In an optional embodiment, step S21 includes the following step S211 and S212.

In step S211, the audio signal of the audio is divided into multiple sub audio signals, and the sub audio signals are respectively converted into frequency domain signals. Each of the sub audio signals corresponds to each of the frequency bands.

In step S212, the first speech spectrum parameters respectively corresponding to the frequency bands are determined.

Figure 2B:
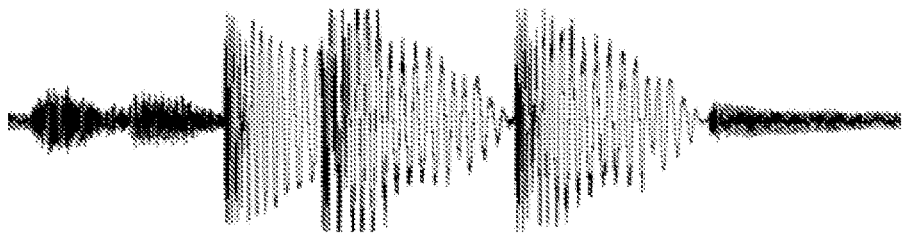
FIG. 2b is a schematic diagram of an audio signal in the audio onset detection method according to the first embodiment of the present disclosure.
Figure 2C:
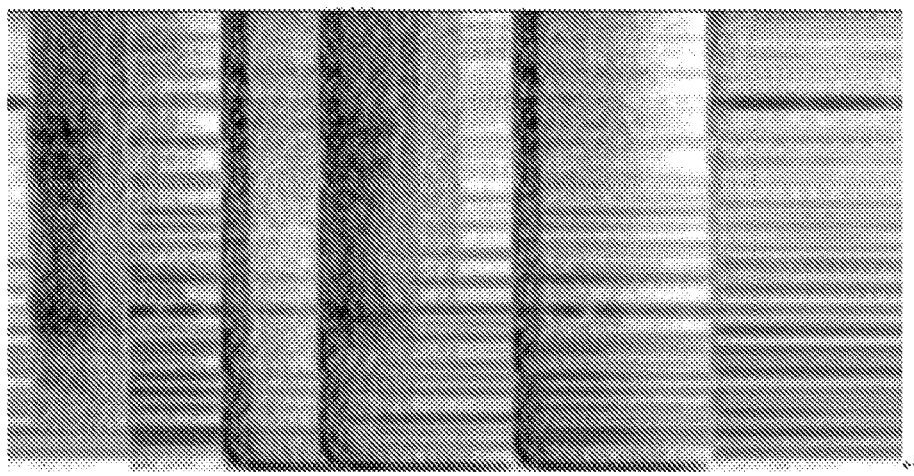
FIG. 2c is a schematic diagram showing a speech spectrum of the audio signal in the audio onset detection method according to the first embodiment of the present disclosure.

Specifically, the audio signal is a one-dimensional discrete time sequence, and may be expressed as $X=\{x_1, x_2 \ldots x_N\}$, where N represents a total number of discrete sample points. Although the audio signal is a kind of signal that non-periodically changes with time, the audio signal may present an approximately stable (approximately periodical) characteristic in a relative short time period (generally defined as a period ranging from 10 ms to 40 ms). The audio signal is divided into short time speech segments having a same length, i.e., sub audio signals for analysis. For example, as shown in FIG. 2b, for an audio signal with a sampling rate of 16000 Hz, 512 sample points may be selected to form a sub audio signal, which corresponds to a speech length of 32 ms.

Specifically, the audio signal is a one-dimensional discrete time sequence, and may be expressed as X={$x_1$, $x_2$ ... $x_N$}, where N represents a total number of discrete sample points. Although the audio signal is a kind of signal that non-periodically changes with time, the audio signal may present an approximately stable (approximately periodical) characteristic in a relative short time period (generally defined as a period ranging from 10 ms to 40 ms). The audio signal is divided into short time speech segments having a same length, i.e., sub audio signals for analysis. For example, as shown in FIG. 2b, for an audio signal with a sampling rate of 16000 Hz, 512 sample points may be selected to form a sub audio signal, which corresponds to a speech length of 32 ms.

The corresponding frequency domain signal may be expressed as:

$$Y_n(k) = \sum_{m=0}^{L} x_{(n+m)} * e^{-\frac{2\pi mk}{L}},$$

where n represents a n-th sub audio signal, L represents a length of the sub audio signal, and k represents a k-th frequency band.

The corresponding frequency domain signal may be expressed as:

$$Y_n(k) = \sum_{m=0}^{L} x_{(n+m)} * e^{-2\pi mk/L},$$

where n represents a n-th sub audio signal, L represents a length of the sub audio signal, and k represents a k-th frequency band.

In a case that the audio signal is divided into multiple sub audio signals, the first speech spectrum parameter may be a comprehensive weighting of spectrum amplitudes and spectrum phases of the sub audio signals. For example, the first speech spectrum parameter may be calculated according to the following formula:

$$cpx(n) = \sum_{k=1}^{L} \sqrt{(|Y_n(k)| - |Y_{n-1}(k)|)^2 + (|Y_n(k)| * \sin(\ddot{\varphi}_n(k)))^2},$$

where $|Y_n(k)|$ represents an amplitude of the k-th frequency band, $\ddot{\varphi}_n(k)$ represents a second-order phase difference of the k-th frequency band and is expressed as $\ddot{\varphi}_n(k)=\dot{\varphi}_n(k)-\dot{\varphi}_{n-1}(k)$, $\dot{\varphi}_n(k)$ represents a first-order phase difference of the k-th frequency band and is expressed as $\dot{\varphi}_n(k)=\varphi_n(k)-\varphi_{n-1}(k)$ and $\varphi_n(k)$ represents a phase of the k-th frequency band. The second-order phase difference is used in this embodiment, by which onset information can be better represented.

In some embodiment, the preset number may be customized.

Specifically, in the process of determining second speech spectrum parameters of the frequency bands, any one of the frequency bands is selected as a current frequency band, and a second speech spectrum parameter of the current frequency band is determined based on a first speech spectrum parameter of the current frequency band and a first speech spectrum parameter of a frequency band chronologically before the current frequency band. Next, any one of the remaining frequency bands is selected as a current frequency band, and the above operation is repeated until second speech spectrum parameters of all of the frequency bands are determined.

In step S23, one or more onsets of a note and a syllable in the audio are determined based on the second speech spectrum parameters of the frequency bands.

In an optional embodiment, step S23 includes the following steps S231 and S232.

In step S231, a speech spectrum parameter curve is drawn based on the second speech spectrum parameters of the frequency bands.

In step S232, a local highest point is determined according to the speech spectrum parameter curve, and one or more onsets of the note and the syllable in the audio are determined based on a second speech spectrum parameter corresponding to the local highest point.

In the embodiment of the present disclosure, according to a frequency domain signal corresponding to an audio signal of an audio, first speech spectrum parameters of frequency bands are determined. For each of the frequency bands, a second speech spectrum parameter of a current frequency band is determined based on a first speech spectrum parameter of the current frequency band and a first speech spectrum parameter of a frequency band chronologically before the current frequency band. One or more onsets of a note and a syllable in the audio are determined based on second speech spectrum parameters of the frequency bands. Since the second speech spectrum parameters are determined with reference to the first speech spectrum parameters corresponding to multiple frequency bands, the determined second speech spectrum parameters are more accurate, so that the onsets of a note and a syllable in the audio can be accurately detected, thereby reducing false detection and missing detection. Further, the referred first speech spectrum parameter is a first speech spectrum parameter of a frequency band chronologically before the current frequency band, ensuring real-time performance of the onset detection.

The Second Embodiment

Figure 3:
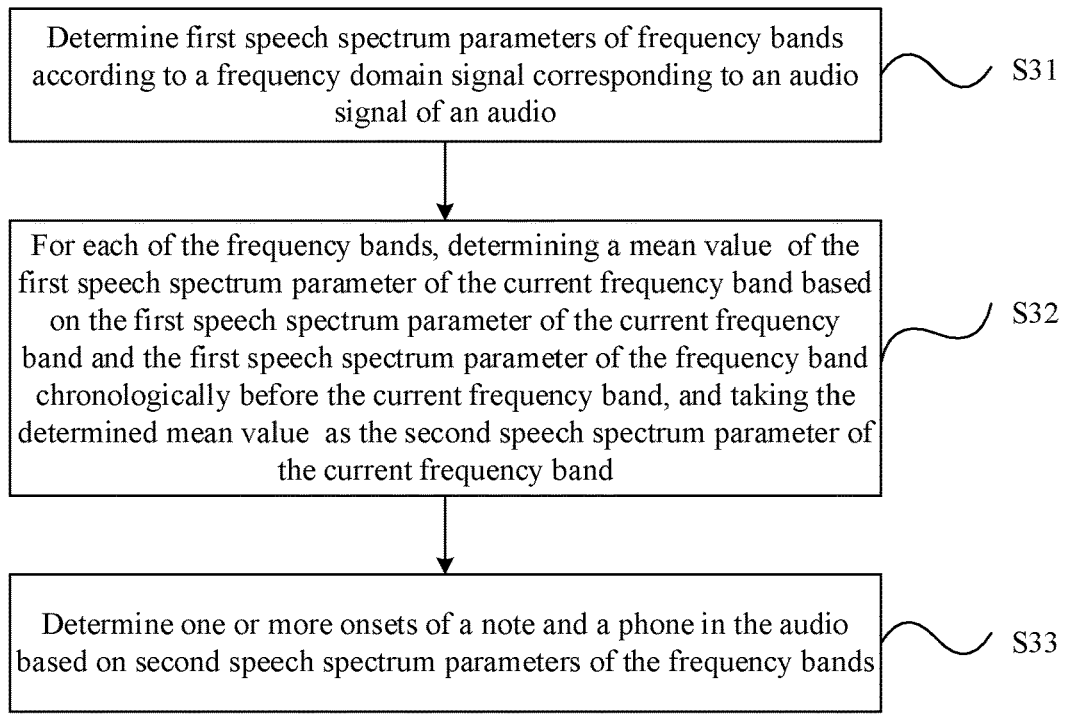
FIG. 3 is a flow chart of an audio onset detection method according to a second embodiment of the present disclosure.

FIG. 3 is a flow chart of an audio onset detection method according to a second embodiment of the present disclosure. Based on the above embodiment, the step of determining a second speech spectrum parameter of a current frequency band based on a first speech spectrum parameter of the current frequency band and a first speech spectrum parameter of a frequency band chronologically before the current frequency band is further optimized in this embodiment. This embodiment may be applied to some scenarios in which an audio (such as a mixed music formed by multiple musical instruments, a music with a slow-paced rhythm and a human voice) is complex and has a weak rhythm. As shown in FIG. 3, the method includes the following steps S31 to S33.

In step S31, according to a frequency domain signal corresponding to an audio signal of an audio, first speech spectrum parameters of frequency bands are determined.

In step S32, for each of the frequency bands, a mean value of a first speech spectrum parameter of a current frequency band based on the first speech spectrum parameter of the current frequency band and a first speech spectrum parameter of a frequency band chronologically before the current frequency band is determined, and taking the determined mean value as a second speech spectrum parameter of the current frequency band.

In step S33, one or more onsets of a note and a syllable in the audio are determined based on second speech spectrum parameters of the frequency bands.

In the embodiment of the present disclosure, a mean value corresponding to each of the frequency bands is determined, and the onsets of a note and a syllable in the audio are determined based on the mean values corresponding to the frequency bands, which can suppress the glitch in a curve formed by the mean value, and further improves accuracy of the onset detection. Further, the referred first speech spectrum parameter is a first speech spectrum parameter of a frequency band chronologically before the current frequency band, ensuring real-time performance of the onset detection.

The Third Embodiment

Figure 4A:
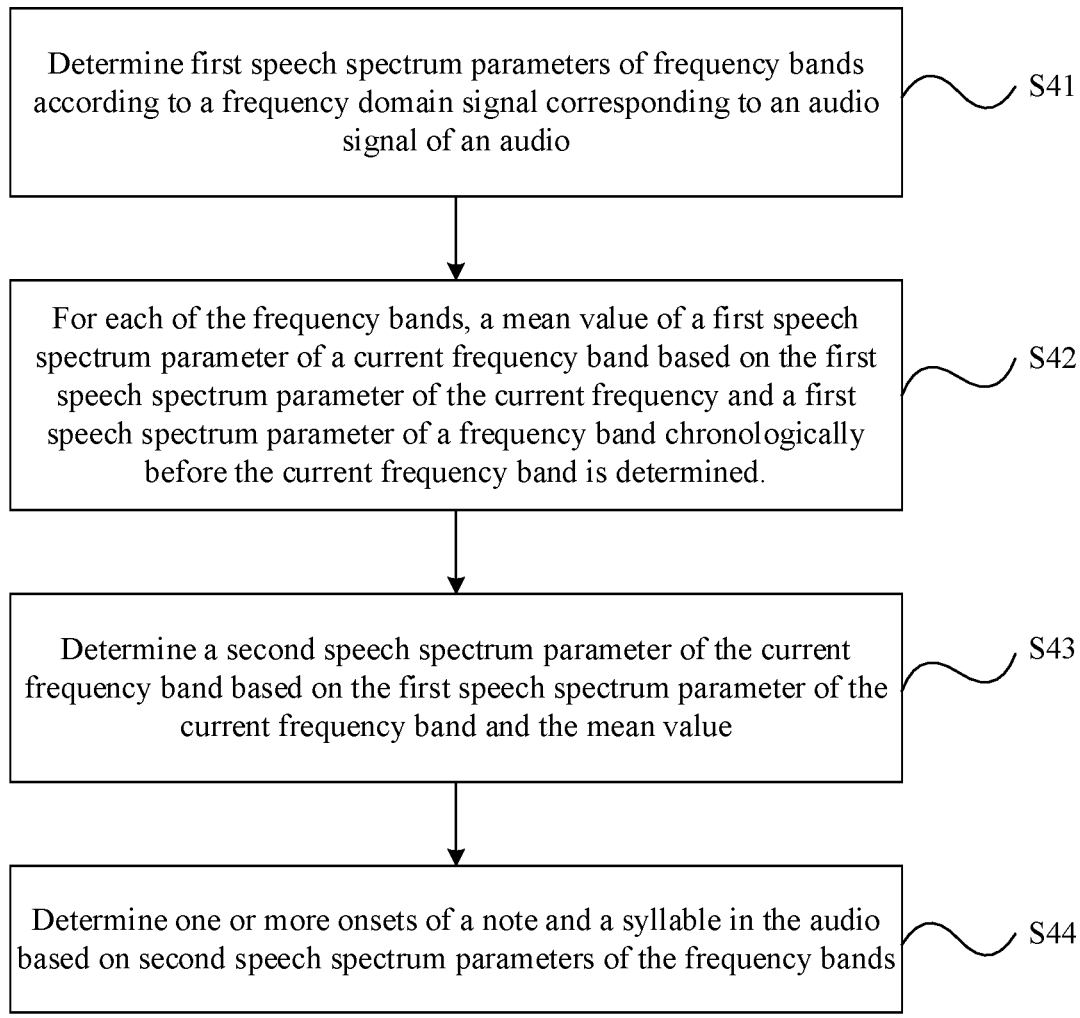
FIG. 4a is a flow chart of an audio onset detection method according to a third embodiment of the present disclosure.

FIG. 4a is a flow chart of an audio onset detection method according to a third embodiment of the present disclosure. Based on the above embodiment, the step of determining a second speech spectrum parameter of a current frequency band based on a first speech spectrum parameter of the current frequency band and a first speech spectrum parameter of a frequency band chronologically before the current frequency band is further optimized in this embodiment. This embodiment may be applied to some scenarios in which an audio (such as a mixed music formed by multiple musical instruments, a music with a slow-paced rhythm and a human voice) is complex and has a weak rhythm. As shown in FIG. 4a, the method includes the following steps S41 to S44.

In step S41, according to a frequency domain signal corresponding to an audio signal of an audio, first speech spectrum parameters of frequency bands are determined.

In step S42, for each of the frequency bands, a mean value of a first speech spectrum parameter of a current frequency band based on the first speech spectrum parameter of the current frequency and a first speech spectrum parameter of a frequency band chronologically before the current frequency band is determined.

In step S43, a second speech spectrum parameter of the current frequency band is determined based on the first speech spectrum parameter of the current frequency band and the mean value.

In an alternative embodiment, step S43 includes the following steps S431 and S432.

In step S431, a difference between the first speech spectrum parameter of the current frequency band and the mean value is calculated.

In step S432, the second speech spectrum parameter of the current frequency band is determined based on the difference.

Furthermore, step S432 may be performed by performing the following processes.

Figure 4B:
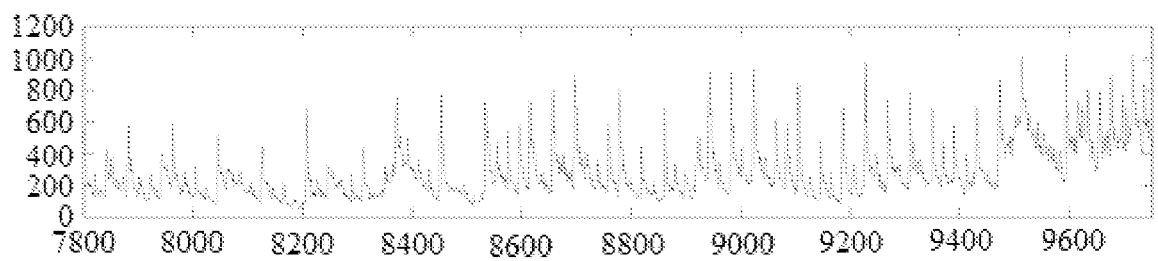
FIG. 4b is a schematic diagram showing a curve including a glitch signal that is formed by a speech spectrum parameter in the audio onset detection method according to the third embodiment of the present disclosure.
Figure 4C:
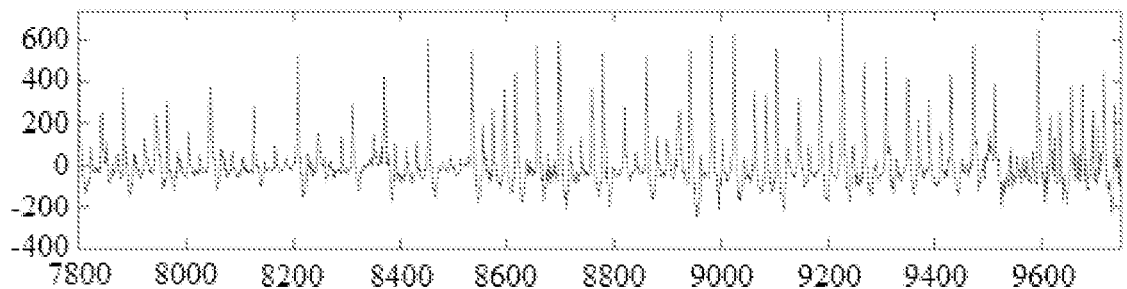
FIG. 4c is a schematic diagram showing a curve formed by the speech spectrum parameter in the audio onset detection method according to the third embodiment of the present disclosure.
Figure 4D:
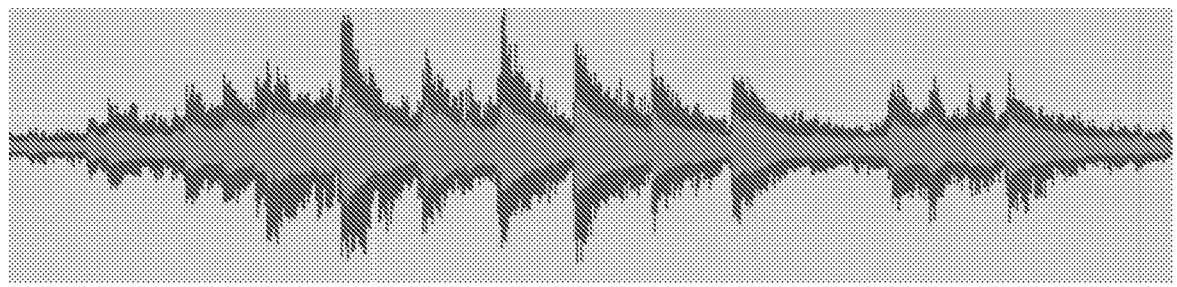
FIG. 4d is a schematic diagram of an audio signal in the audio onset detection method according to the third embodiment of the present disclosure.
Figure 4E:
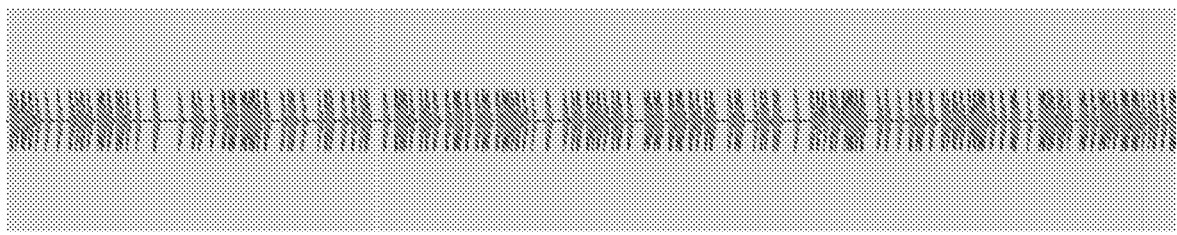
FIG. 4e is a schematic diagram showing a detection result for the audio signal shown in FIG. 4d with an conventional audio onset detection method.
Figure 4F:
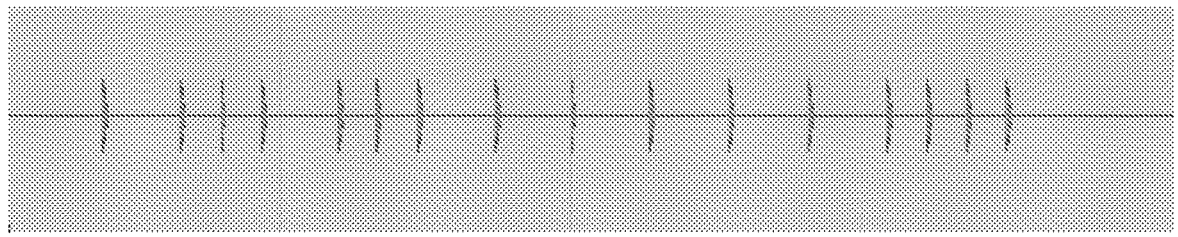
FIG. 4f is a schematic diagram showing a detection result for the audio signal shown in FIG. 4d with the audio onset detection method according to the third embodiment of the present disclosure.

A mean value of the difference according to a difference corresponding to the current frequency band and a difference corresponding to the frequency band chronologically before the current frequency band is determined as the second speech spectrum parameter of the current frequency band, so that the glitch signal in the curve can be removed in the process of determining the onset based on the second speech spectrum parameter. For example, FIG. 4b shows a curve including a glitch signal that is formed by a speech spectrum parameter, and FIG. 4c shows a curve formed by a speech spectrum parameter in this solution. As an example, FIG. 4d is a schematic diagram of an audio signal, FIG. 4e is a schematic diagram showing an onset detection result for the audio signal shown in FIG. 4d with an conventional audio onset detection method, and FIG. 4f is a schematic diagram showing an onset detection result for the audio signal shown in FIG. 4d with the audio onset detection method in this embodiment.

In step S44, one or more onsets of a note and a syllable in the audio are determined based on second speech spectrum parameters of the frequency bands.

In the embodiment of the present disclosure, the second speech spectrum parameter is determined with reference to the first speech spectrum parameters corresponding to multiple frequency bands, the determined second speech spectrum parameter is more accurate, so that the onsets of a note and a syllable in the audio can be accurately detected, thereby reducing false detection and missing detection. Further, a difference mean value corresponding to each of the frequency bands is determined, and the onsets of a note and a syllable in an audio are determined based on difference mean values corresponding to the frequency bands, which can suppress the glitch in the curve, and further improves accuracy of the onset detection. Furthermore, the referred first speech spectrum parameter is a first speech spectrum parameter of a frequency band chronologically before the current frequency band, ensuring real-time performance of the onset detection.

The Fourth Embodiment

Figure 5:
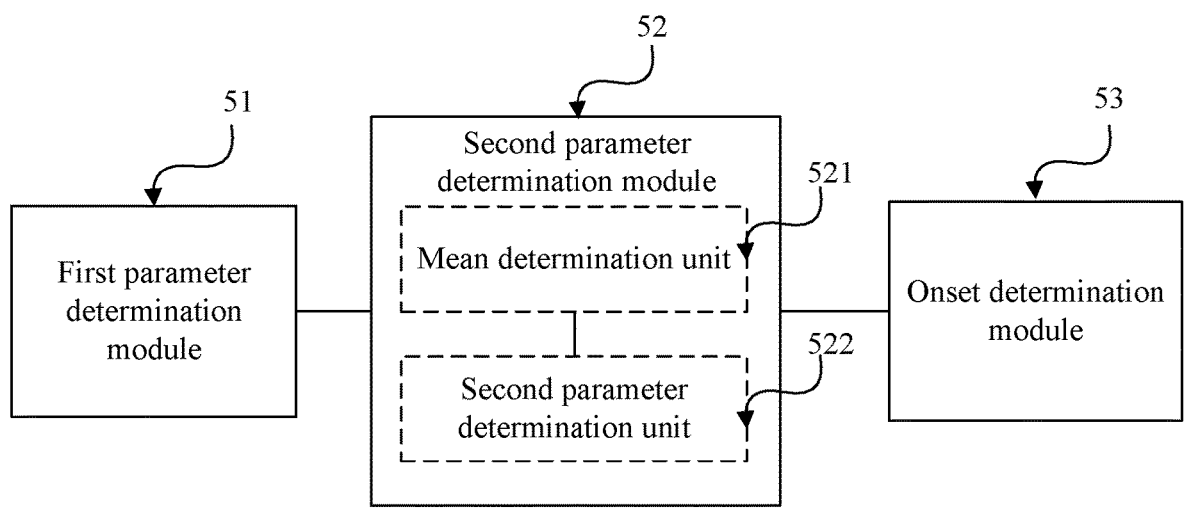
FIG. 5 is a schematic structural diagram showing an audio onset detection device according to a fourth embodiment of the present disclosure.

FIG. 5 is a schematic structural diagram showing an audio onset detection device according to a fourth embodiment of the present disclosure. The audio onset detection device may be implemented as software, or a combination of hardware and software. The audio onset detection device may be integrated in a device of an audio onset detection system, such as an audio onset detection server or an audio onset detection terminal device. This embodiment may be applied to some scenarios in which an audio (such as a mixed music formed by multiple musical instruments, a music with a slow-paced rhythm and a human voice) is complex and has a weak rhythm. As shown in FIG. 5, the device includes a first parameter determination module 51, a second parameter determination module 52 and an onset determination module 53.

The first parameter determination module 51 is configured to determine first speech spectrum parameters of frequency bands according to a frequency domain signal corresponding to an audio signal of an audio.

The second parameter determination module 52 is configured to determine, for each of the frequency bands, a second speech spectrum parameter of a current frequency band based on a first speech spectrum parameter of the current frequency band and a first speech spectrum parameter of a frequency band chronologically before the current frequency band.

The onset determination module 53 is configured to determine one or more onsets of a note and a syllable in the audio based on second speech spectrum parameters of the frequency bands.

Further, the second parameter determination module 52 is specifically configured to: for each of the frequency bands, determine a mean value of the first speech spectrum parameter of the current frequency band based on the first speech spectrum parameter of the current frequency band and the first speech spectrum parameter of the frequency band chronologically before the current frequency band, and taking the determined mean value as the second speech spectrum parameter of the current frequency band.

Further, the second parameter determination module 52 includes a mean value determination unit 521 and a second parameter determination unit 522.

The mean value determination unit 521 is configured to: for each of the frequency bands, determine a mean value of the first speech spectrum parameter of the current frequency band and taking the determined mean value and the first speech spectrum parameter of the frequency band chronologically before the current frequency band.

The second parameter determination unit 522 is configured to determine the second speech spectrum parameter of the current frequency band based on the first speech spectrum parameter of the current frequency band and the mean value.

Further, the second parameter determination unit 522 is specifically configured to: calculate a difference between the first speech spectrum parameter of the current frequency band and the mean value; and determine the second speech spectrum parameter of the current frequency band based on the difference.

Further, the second parameter determination unit 522 is specifically configured to determine a mean value of the difference corresponding to the current frequency band and a difference according to a difference corresponding to the frequency band chronologically before the current frequency band, as the second speech spectrum parameter of the current frequency band.

Further, the onset determination module 53 is specifically configured to draw a speech spectrum parameter curve based on the second speech spectrum parameters of the frequency bands; and determine a local highest point according to the speech spectrum parameter curve, and determine one or more onsets of the note and the syllable in the audio based on a second speech spectrum parameter corresponding to the local highest point.

Further, the first parameter determination module 51 is specifically configured to divide the audio signal of the audio into multiple sub audio signals, and convert the sub audio signals respectively into frequency domain signals, where each of the sub audio signals corresponds to each of the frequency bands; and determine the first speech spectrum parameters corresponding to the frequency bands, respectively.

For the detailed description of operation principles and technical effects of embodiments of the audio onset detection device, reference is made to the relevant description in the above embodiments of the audio onset detection method, which is not described in detail.

The Fifth Embodiment

Figure 6:
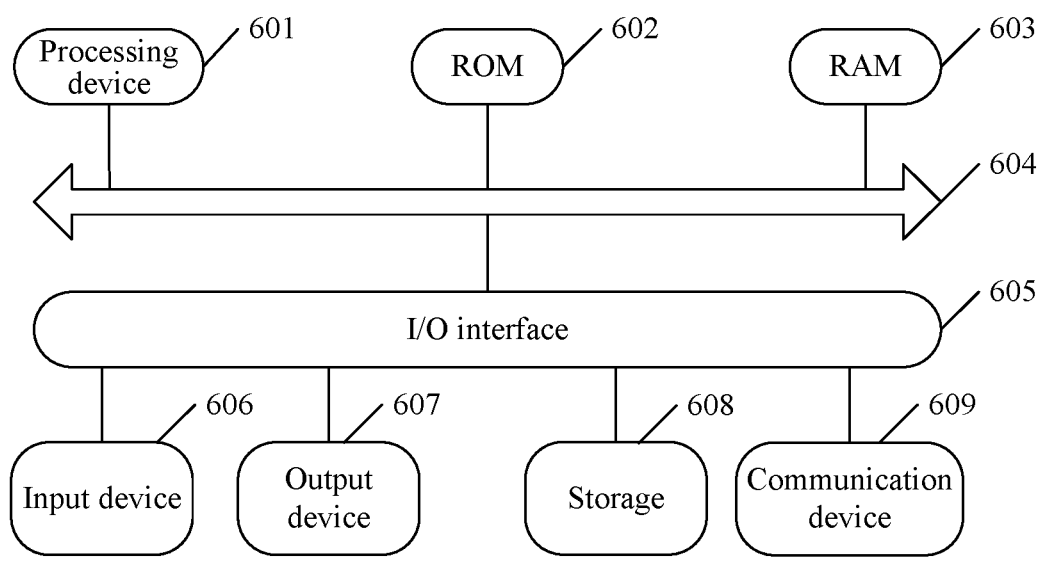
FIG. 6 is a schematic structural diagram showing an electronic device according to a fifth embodiment of the present disclosure.

Reference is made to FIG. 6, which is a schematic structural diagram of an electronic device applicable to implement the embodiments of the present disclosure. The electronic devices according to the embodiments of the present disclosure may include, but are not limited to, mobile terminals such as mobile syllables, notebook computers, digital broadcast receivers, personal digital assistants (PDAs), tablets (PADs), portable multimedia players (PMPs) and vehicle-mounted terminals (for example, car navigation terminals), and fixed terminals such as digital TVs and desktop computers. The electronic device shown in FIG. 6 is provided only for illustration rather than limitation to functions and applications of the embodiments of the present disclosure.

As shown in FIG. 6, the electronic device includes a processing apparatus 601 (for example, a central processor and a graphics processor). The processing apparatus 601 may perform various proper operations and processing based on programs stored in a read-only memory (ROM) 602 or programs loaded from a storage apparatus 608 to a random-access memory (RAM) 603. The RAM 603 also stores various data and programs required for operations of the electronic device. The processing apparatus 601, the ROM 602, and the RAM 603 are connected to each other via a bus 604. An input/output (I/O) interface 605 is also connected to the bus 604.

The following apparatuses may be connected to the I/O interface 605, including: an input apparatus 606 such as a touch screen, a touch pad, a keyboard, a mouse, an image sensor, a microsyllable, an accelerometer and a gyroscope; an output apparatus 607 such as a liquid crystal display (LCD), a speaker, and a vibrator; a storage apparatus 608 such as a magnetic tape and a hard disk; and a communication apparatus 609. The communication apparatus 609 may allow the electronic device to perform wireless or wired communication with other devices to exchange data. Although FIG. 6 shows the electronic device having various apparatuses, it should be understood that the electronic device is not required to implement or have all the illustrated apparatuses. The electronic device may be alternatively implemented or is provided with more or fewer apparatuses.

According to the embodiments of the present disclosure, the above processes described with reference to the flowcharts may be implemented as computer software programs. For example, a computer program product is provided according to an embodiment of the present disclosure. The computer program product includes a computer program carried by a computer readable medium. The computer program includes program codes for performing the method shown in the flowcharts. In this embodiment, the computer program may be downloaded and installed from Internet via the communication apparatus 309, or may be installed from the storage apparatus 608 or the ROM 602. The computer program, when being executed by the processing apparatus 601, can realize the above functions specified in the method in the present disclosure.

It should be noted that, the computer readable medium in the present disclosure may be a computer readable signal medium, a computer readable storage medium, or any combination thereof. The computer readable storage medium may be but is not limited to a system, apparatus, or device in an electronic, magnetic, optical, electromagnetic, infrared, or semi-conductive form, or any combination thereof. Specifically, the computer readable storage medium may be but is not limited to an electric connection having one or more wires, a portable computer disk, a hard disk, a random-access memory (RAM), a read-only memory (ROM), an erasable programmable read-only memory (EPROM or a flash memory), an optical fiber, a portable compact disc read-only memory (CD-ROM), a light storage device, a magnetic storage device or any combination thereof. In the present disclosure, the computer readable storage medium may be any tangible medium including or storing a program. The program may be used by or with a command execution system, apparatus or device. In the present disclosure, the computer readable signal medium may be a data signal transmitted in a baseband or transmitted as a part of a carrier wave, where the data signal carries computer readable program codes. The transmitted data signal may be in various forms, including but not limited to an electromagnetic signal, an optical signal or any proper combination thereof. The computer readable signal medium may further be any computer readable medium other than the computer readable storage medium. The computer readable signal medium can send, transmit or transfer the program that is used by or with a command execution system, apparatus or device. Program codes stored in the computer readable medium may be transmitted via any proper medium including but not limited to, a wire, an optical cable, radio frequency (RF) and the like, or any proper combination thereof.

The above-mentioned computer readable medium may be included in the above-mentioned electronic device; or it may exist alone without being assembled into the electronic device.

The above-mentioned computer readable medium carries one or more programs. When the above-mentioned one or more programs are executed by the electronic device, the one or more programs cause the electronic device to: determine first speech spectrum parameters of frequency bands according to a frequency domain signal corresponding to an audio signal of an audio; determine, for each of the frequency bands, a second speech spectrum parameter of a current frequency band based on a first speech spectrum parameter of the current frequency band and a first speech spectrum parameter of a frequency band chronologically before the current frequency band; and determine one or more onsets of a note and a syllable in the audio based on second speech spectrum parameters of the frequency bands.

Computer program codes for executing operation of the present disclosure may be written in one or more programming languages or a combination thereof. The programming languages may include an object-oriented programming language such as Java, Smalltalk, C++, and may further include a conventional procedural programming language such as "C" or the like. The program codes may be completely or partly executed on a user computer, or executed as a standalone software package. Alternatively, one part of the program codes may be executed on a user computer and the other part of the program codes may be executed on a remote computer, or the program codes may be executed on a remote computer or a server completely. In a case that the program codes are executed on a remote computer completely or partly, the remote computer may be connected to the user computer via any network such as a local area network (LAN) or a wide area network (WAN). Alternatively, the remote computer may be connected to an external computer (for example, the remote computer is connected to the external computer via the Internet provided by an Internet service provider).

The flowcharts and the block diagrams illustrate system structures, functions and operations that may be implemented with the system, the method, and the computer program product according to the embodiments of the present disclosure. In this case, each block in the flowcharts or the block diagrams may represent a module, a program segment, or a part of codes. The module, the program segment, or the part of codes may include one or more executable instructions for implementing a specified logical function. It should be noted that, in some alternative implementations, the functions shown in blocks may be performed in an order different from that indicated in the drawings. For example, steps shown in two adjacent blocks may be performed almost in parallel, or may be performed in reverse order, which is determined based on the functions. It should be further noted that, a function shown in each block of the flowcharts and/or block diagrams, or shown in a combination of blocks of the flowcharts and/or block diagrams may be implemented by a hardware-based system dedicated for performing specified functions or operations, or may be implemented by a combination of a dedicated hardware and computer instructions.

The units involved in the embodiments of the present disclosure may be implemented by hardware or software. Names of the units are not intended to limit the units. For example, the acquiring unit may be described as a unit for acquiring a target human body image. The drag point determination module may be described as "a module for determining a drag point on a template image".

The above describes only preferred embodiments and technical principles used in the present disclosure. It should be understood by those skilled in the art that, the invention scope of the present disclosure is not limited to the technical solutions formed by the specific combinations of the above technical features, and should further cover other technical solutions formed by any combination of the above technical features or equivalent features of the above technical features without departing from the above invention concept, for example, technical solutions formed by interchanging the above features and the technical features having the similar functions as described (but not limited to those) in the present disclosure.

The invention claimed is:

1. An audio onset detection method, comprising:

dividing an audio signal of an audio into a plurality of sub audio signals, and converting the plurality of sub audio signals respectively into frequency domain signals, wherein each of the plurality of sub audio signals corresponds to one of a plurality of frequency bands;

determining a plurality of first speech spectrum parameters corresponding to the plurality of frequency bands, respectively;

determining, for each of the plurality of frequency bands, a second speech spectrum parameter of a current frequency band based on a first speech spectrum parameter of the current frequency band and a first speech spectrum parameter of a frequency band chronologically before the current frequency band, wherein the determining, for each of the plurality of frequency bands, a second speech spectrum parameter of a current frequency band based on a first speech spectrum parameter of the current frequency band and a first speech spectrum parameter of a frequency band chronologically before the current frequency band further comprises:

with respect to each of the plurality of frequency bands, determining a mean value of the first speech spectrum parameter of the current frequency band based on the first speech spectrum parameter of the current frequency band and the first speech spectrum parameter of the frequency band chronologically before the current frequency band, and determining the second speech spectrum parameter of the current frequency band based on the determined mean value; and determining one or more onsets of a note and a syllable in the audio based on second speech spectrum parameters of the frequency bands.

2. The audio onset detection method according to claim 1, further comprising:

identifying the determined mean value as the second speech spectrum parameter of the current frequency band.

3. The audio onset detection method according to claim 1, further comprising:
   determining the second speech spectrum parameter of the current frequency band based on the first speech spectrum parameter of the current frequency band and the determined mean value.

4. The audio onset detection method according to claim 3, wherein the determining the second speech spectrum parameter of the current frequency band based on the first speech spectrum parameter of the current frequency band and the determined mean value comprises:
   calculating a difference between the first speech spectrum parameter of the current frequency band and the determined mean value; and
   determining the second speech spectrum parameter of the current frequency band based on the difference.

5. The audio onset detection method according to claim 4, wherein the determining the second speech spectrum parameter of the current frequency band based on the difference comprises:
   determining a mean value of the difference according to a difference corresponding to the current frequency band and a difference corresponding to the frequency band chronologically before the current frequency band; and
   identifying the determined mean value of the difference as the second speech spectrum parameter of the current frequency band.

6. The audio onset detection method according to claim 1, wherein the determining one or more onsets of a note and a syllable in the audio based on second speech spectrum parameters of the frequency bands comprises:
   drawing a speech spectrum parameter curve based on the second speech spectrum parameters of the frequency bands; and
   determining a local highest point according to the speech spectrum parameter curve, and determining one or more onsets of the note and the syllable in the audio based on a second speech spectrum parameter corresponding to the local highest point.

7. An audio onset detection device, comprising:
   at least one processor; and
   at least one memory communicatively coupled to the at least one processor and storing instructions that upon execution by the at least one processor cause the at least one processor to perform operations comprising:
   dividing an audio signal of an audio into a plurality of sub audio signals, and converting the plurality of sub audio signals respectively into frequency domain signals, wherein each of the plurality of sub audio signals corresponds to one of a plurality of frequency bands;
   determining a plurality of first speech spectrum parameters corresponding to the plurality of frequency bands, respectively;
   determining, for each of the frequency bands, a second speech spectrum parameter of a current frequency band based on a first speech spectrum parameter of the current frequency band and a first speech spectrum parameter of a frequency band chronologically before the current frequency band, wherein the determining, for each of the plurality of frequency bands, a second speech spectrum parameter of a current frequency band based on a first speech spectrum parameter of the current frequency band and a first speech spectrum parameter of a frequency band chronologically before the current frequency band further comprises:
   with respect to each of the plurality of frequency bands, determining a mean value of the first speech spectrum parameter of the current frequency band based on the first speech spectrum parameter of the current frequency band and the first speech spectrum parameter of the frequency band chronologically before the current frequency band, and determining the second speech spectrum parameter of the current frequency band based on the determined mean value; and
   determining one or more onsets of a note and a syllable in the audio based on second speech spectrum parameters of the frequency bands.

8. The device of claim 7, wherein the operations further comprise:
   identifying the determined mean value as the second speech spectrum parameter of the current frequency band.

9. The device of claim 7, wherein the operations further comprise:
   determining the second speech spectrum parameter of the current frequency band based on the first speech spectrum parameter of the current frequency band and the determined mean value.

10. The device of claim 9, wherein the operations further comprise:
    calculating a difference between the first speech spectrum parameter of the current frequency band and the determined mean value; and
    determining the second speech spectrum parameter of the current frequency band based on the difference.

11. The device of claim 10, wherein the operations further comprise:
    determining a mean value of the difference according to a difference corresponding to the current frequency band and a difference corresponding to the frequency band chronologically before the current frequency band; and
    identifying the determined mean value of the difference as the second speech spectrum parameter of the current frequency band.

12. The device of claim 7, wherein the operations further comprise:
    drawing a speech spectrum parameter curve based on the second speech spectrum parameters of the frequency bands; and
    determining a local highest point according to the speech spectrum parameter curve; and
    determining one or more onsets of the note and the syllable in the audio based on a second speech spectrum parameter corresponding to the local highest point.

13. A non-transitory computer readable storage medium, storing non-transitory computer readable instructions that, when executed by a computer, causes the computer to perform operations comprising:
    dividing an audio signal of an audio into a plurality of sub audio signals, and converting the plurality of sub audio signals respectively into frequency domain signals, wherein each of the plurality of sub audio signals corresponds to one of a plurality of frequency bands;
    determining a plurality of first speech spectrum parameters corresponding to the plurality of frequency bands, respectively;
    determining, for each of the frequency bands, a second speech spectrum parameter of a current frequency band based on a first speech spectrum parameter of the current frequency band and a first speech spectrum parameter of a frequency band chronologically before the current frequency band, wherein the determining, for each of the plurality of frequency bands, a second speech spectrum parameter of a current frequency band based on a first speech spectrum parameter of the current frequency band and a first speech spectrum parameter of a frequency band chronologically before the current frequency band further comprises:

with respect to each of the plurality of frequency bands, determining a mean value of the first speech spectrum parameter of the current frequency band based on the first speech spectrum parameter of the current frequency band and the first speech spectrum parameter of the frequency band chronologically before the current frequency band, and determining the second speech spectrum parameter of the current frequency band based on the determined mean value; and determining one or more onsets of a note and a syllable in the audio based on second speech spectrum parameters of the frequency bands.

14. The non-transitory computer readable storage medium according to claim 13, wherein the operations further comprise:
identifying the determined mean value as the second speech spectrum parameter of the current frequency band.

15. The non-transitory computer readable storage medium according to claim 13, wherein the operations further comprise:
determining the second speech spectrum parameter of the current frequency band based on the first speech spectrum parameter of the current frequency band and the determined mean value.

16. The non-transitory computer readable storage medium according to claim 15, wherein the operations further comprise:
calculating a difference between the first speech spectrum parameter of the current frequency band and the determined mean value; and
determining the second speech spectrum parameter of the current frequency band based on the difference.

17. The non-transitory computer readable storage medium according to claim 16, wherein the operations further comprise:
determining a mean value of the difference according to a difference corresponding to the current frequency band and a difference corresponding to the frequency band chronologically before the current frequency band; and
identifying the determined mean value of the difference as the second speech spectrum parameter of the current frequency band.

18. The non-transitory computer readable storage medium according to claim 13, wherein the operations further comprise:
drawing a speech spectrum parameter curve based on the second speech spectrum parameters of the frequency bands; and
determining a local highest point according to the speech spectrum parameter curve; and
determining one or more onsets of the note and the syllable in the audio based on a second speech spectrum parameter corresponding to the local highest point.

* * * * *